United States Patent [19]

Bray

[11] 4,208,289

[45] * Jun. 17, 1980

[54] REVERSE OSMOSIS APPARATUS EMPLOYING A RECIPROCATING MEMBRANE CARTRIDGE

[75] Inventor: Donald T. Bray, Escondido, Calif.

[73] Assignee: Desalination Systems, Inc., Escondido, Calif.

[*] Notice: The portion of the term of this patent subsequent to Jan. 24, 1995, has been disclaimed.

[21] Appl. No.: 958,938

[22] Filed: Nov. 8, 1978

[51] Int. Cl.² .................. B01D 13/00; B01D 33/00; C02B 1/82

[52] U.S. Cl. .................. 210/321 R; 210/450; 210/494 M

[58] Field of Search ............... 210/321 R, 331, 332, 210/416, 493 M, 494 M, 359, 450

[56] References Cited

U.S. PATENT DOCUMENTS

| | | | |
|---|---|---|---|
| 3,830,372 | 8/1974 | Manjikion | 210/321 R |
| 4,016,083 | 4/1977 | Sakaguchi et al. | 210/433 M |
| 4,046,685 | 9/1977 | Bray | 210/321 R X |
| 4,070,280 | 1/1978 | Bray | 210/23 H |

*Primary Examiner*—Charles N. Hart
*Assistant Examiner*—Ferris H. Lander
*Attorney, Agent, or Firm*—Clement H. Allen

[57] ABSTRACT

A semipermeable membrane cartridge is reciprocated within a pressure resistant vessel to provide improved liquid flow and turbulence over the semipermeable membrane surfaces. The end of the semipermeable membrane cartridge exposed to the pressure of feed liquid introduced into one end of the pressure resistant vessel is adjusted or arranged to be of substantially the same effective cross sectional area as that of the end of the cartridge exposed to the pressure of brine being released from the other end of the pressure resistant vessel. This essentially balances the liquid pressure forces on the ends of the semipermeable membrane cartridge to provide improved conditions for reciprocation.

4 Claims, 3 Drawing Figures

REVERSE OSMOSIS APPARATUS EMPLOYING A RECIPROCATING MEMBRANE CARTRIDGE

BACKGROUND OF THE INVENTION

1. The Field of the Invention

This invention relates to apparatus for purifying a liquid by reverse osmosis, and more particularly to such apparatus employing a semipermeable membrane cartridge reciprocated within a pressure resistant vessel.

2. The Prior Art

In my U.S. Pat. No. 4,070,280 issued Jan. 24, 1978, I have described and claimed reverse osmosis apparatus in which a hollow tube passes slidably and sealingly through one end of a pressure resistant vessel or container and is connected to the permeate collector tube of a semipermeable membrane cartridge slidably enclosed within the pressure resistant vessel. Permeate may be withdrawn through the hollow tube which also serves as a mechanism for importing reciprocal motion to the semipermeable membrane cartridge. Pressurized feed water is introduced into the pressure resistant vessel near one end, and concentrate or brine is released near the other end, the release pressure being controlled by a restrictor or other device to maintain reverse osmosis operating pressure within the pressure resistant vessel. This arrangement produces an improvement in operation because boundary layer conditions at the membrane surface are mitigated or alleviated by the turbulence and flow of the feed water produced by reciprocation of the semipermeable membrane cartridge. However, the force necessary to move such a semipermeable membrane cartridge in one direction can be different from that required to move it in the opposite direction. This occurs because the effective pressurized area of the end of the semipermeable membrane cartridge to which the actuating hollow tube is attached is less than that of the other end of the cartridge, due to the area covered by the cross section of the hollow tube. Even though the hollow tube exterior diameter may be small, the resulting force difference may be substantial if the liquid pressure inside the pressure resistant container is high, and this may be of the order of up to 1,000 psi. Apparatus that would provide a balanced load imparted by contained liquid at each end of the semipermeable membrane cartridge would provide a valuable improvement.

SUMMARY OF THE INVENTION

This invention comprises apparatus for purifying a liquid by a reverse osmosis in which a tubular pressure resistant vessel contains a semipermeable membrane cartridge which comprises a membrane, a permeate transfer sheet, and a spacer sheet all spirally wound around a central permeate collection tube, and providing generally longitudinal channels for passage of feed liquid therethrough. The semipermeable membrane cartridge is of cylindrical configuration, is of length materially shorter than the tubular pressure resistant vessel, and is of diameter to fit slidably inside the tubular pressure resistant vessel. Means, such as a pump and piping, are provided for introducing pressurized feed liquid into the tubular pressure resistant vessel near one end thereof; and means, such as piping and a restrictor or back pressure control valve, are provided for releasing concentrate or brine from the tubular pressure resistant vessel near its other end, while maintaining operating pressure, which may be of the order of several hundred psi more or less, therein. Means, such as a hollow tube slidably sealed to the central permeate collector, and passing sealingly through an end of the pressure resistant vessel serves to release permeate from one end of the semipermeable membrane cartridge. Means, such as a rod attached to the other end of the semipermeable membrane cartridge and which passes sealingly through the other end of the tubular pressure resistant vessel, for reciprocating the semipermeable membrane cartridge within the tubular pressure resistant vessel, may be actuated by mechanical, electrical or human effort, for example a hand operated lever system.

The effective cross sectional area of the end of the semipermeable membrane cartridge exposed to longitudinal pressure of the feed water is arranged to be substantially the same as the effective cross sectional area of the end of semipermeable membrane cartridge exposed to the longitudinal pressure of the concentrate or brine, which will be at the other end of the cartridge. Means to accomplish this may comprise a permeate release tube at one end of the semipermeable membrane cartridge of substantially the same external diameter as the external diameter of the reciprocating rod at the other end. The forces exerted by the pressure of feed water against one end of the semipermeable membrane cartridge and the pressure of brine against the other end will then be essentially balanced, and reciprocating effort required will be essentially the same in both directions.

DESCRIPTION OF PREFERRED EMBODIMENTS

Figure 1:
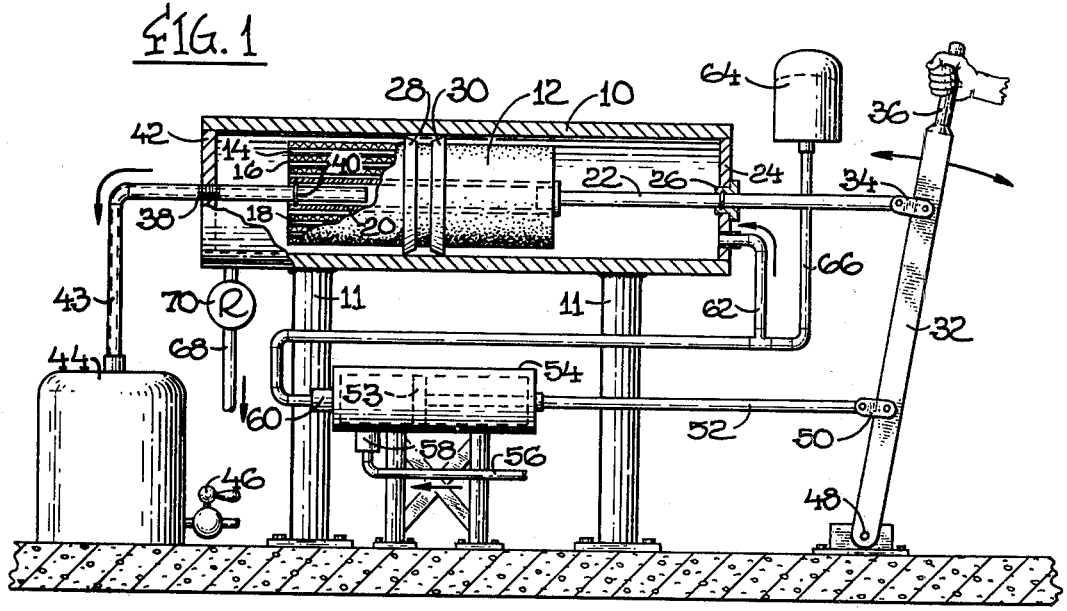
FIG. 1 shows a general side view, partly broken out, of apparatus embodying features of this invention.
Figure 2:
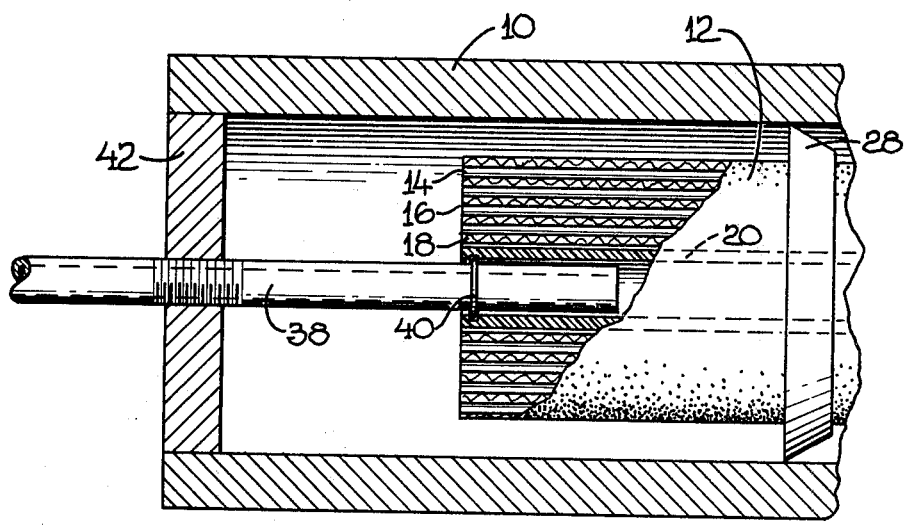
FIG. 2 shows a fragmentary side view, partly broken out and enlarged, of one end of the pressure resistant vessel of FIG. 1.

Referring now to FIGS. 1 and 2, the apparatus comprises a tubular, pressure resistant container 10, fixedly mounted as by supports 11, in which is housed a semipermeable membrane cartridge 12 which has generally longitudinal channels, that is from end to end, for passage of feed solution therethrough. Such a cartridge is exemplified by the so-called spiral wound type having at least one semipermeable membrane 14, permeate transfer sheet 16, and spacer sheet 18, all spirally wound around a central permeate collector tube 20. Semipermeable membrane cartridge 12 is materially shorter than the interior of pressure resistant container 10, that is shorter by a substantial amount. It is slidable therein and has attached to one of its ends, preferably as shown at the location of the closed end of permeate collector 20, a rod 22 which passes slidably through a suitably attached end 24 of pressure resistant container 10. A suitable gland or packing 26 seals rod 22 where it passes through contianer end 24.

A suitable arrangement may be provided for preventing leakage or blow-by between semipermeable membrane cartridge 12 and the interior of container 10, which in the embodiment illustrated comprises a pair of opposite-facing chevron seals 28 and 30. These will prevent deleterious leakage between the exterior surface of membrane cartridge 12 and the interior surface of container 10 when reciprocal motion, with respect to container 10, is imparted to membrane cartridge 12 by means such as rod 22 attached to an end thereof and actuated, for example, by lever 32 connected thereto by link 34, and which itself can be operated by handle 36.

At the other end of pressure resistant container 10, a fixed rigid tube 38 intrudes and is slidably sealed and connected by resilient "O" ring 40 to the central permeate collector 20 at an end of semipermeable membrane cartridge 12 and is also sealed where it passes through the other end 42 of pressure resistant container 10.

At its exterior end, tube 38 is connected by pipe 43 to permeate storage tank 44, from which permeate may be withdrawn when required through valve 46. It is a feature of this invention that the effective cross sectional area of tube 38 within pressure resistant container 10 is substantially the same as the effective cross sectional area of rod 22 within pressure resistant container 10, as will be discussed in detail hereinafter.

The bottom end of lever 32 is pivotably mounted as at 48 to a fixed base, and another link 50 connects it to the piston rod 52 and piston 53 of conventional high pressure pump 54, also fixedly mounted. Feed solution to be purified or treated is introduced through pipe 56 and check valve 58. Feed solution pressurized by pump 54 passes through check valve 60 and pipe 62, which is sealed in its passage through the end 24 of pressure resistant container 10, and thence to the interior thereof. Accumulator 64 is connected conventionally into pipe 62 by pipe 66 to level out pressure pulsations in the feed liquid imparted by pump 54. At or near the other end of pressure resistant container 10, a pipe 68 releases brine or concentrate passing out of the other end of semipermeable membrane cartridge 12, the release being controlled by a restrictor 70 or equivalent conventional back pressure control means such as a spring or gas pressure biased valve, to maintain operating pressure within pressure resistant container 10.

An essential feature of this invention is that the effective cross sectional area of each end of semipermeable membrane cartridge 12 is substantially the same so that the forces exerted on one end by the incoming feed liquid and on the other end by the brine or concentrate will be essentially balanced. This may be accomplished in the embodiment illustrated in FIGS. 1 and 2 by providing a rod 22 at one end of external diameter essentially the same as the external diameter of tube 38 at the other end of semipermeable membrane cartridge 12. The remainder of the areas of these cartridge ends will be exposed to the adjacent liquid pressure and since these effective areas will be substantially the same the forces applied by the feed liquid at one end and the brine or concentrate at the other end will be essentially balanced. Lever 32 may therefore be moved to and fro by handle 36 employing substantially the same reciprocating effort in each direction. Pumping effort required in the case of the piston pump illustrated will be, of course, greater for the compression stroke than for the intake stroke, but the diameter of the pump piston will generally be small compared to the end area of the semipermeable membrane cartridge. The pressure drop of the feed liquid passing through the semipermeable membrane cartridge and emerging as brine at the other will generally be small so that this will not materially affect the forces exerted on substantially equal effective areas at each end of the semipermeable membrane cartridge 12.

In operation of the apparatus of FIGS. 1 and 2, a suitable source of liquid to be purified or treated is introduced through pipe 56. Handle 36 is then moved to and fro which operates pump 54 which then supplies pressurized feed liquid through pipe 62 into one end of pressure resistant container 10. Movement of handle 36 also causes reciprocation of semipermeable membrane cartridge 12 within pressure resistant container 12 to provide beneficial turbulence and flow of pressurized feed solution over the surfaces of membranes 14 in semipermeable membrane cartridge 12. Since the forces exerted by the liquid at each end of the semipermeable membrane cartridge 12 will be substantially equal, effort required to move lever 32 in each direction will be equal so far as cartridge reciprocation is concerned and will be affected essentially only by the effort required to operate pump 54.

The term "effective cross sectional area" is employed in this application to indicate the area at each end of semipermeable membrane cartridge 12 exposed to force exerted by pressure of the adjacent liquid in a direction parallel to the longitudinal axis of the semipermeable membrane cartridge.

Figure 3:
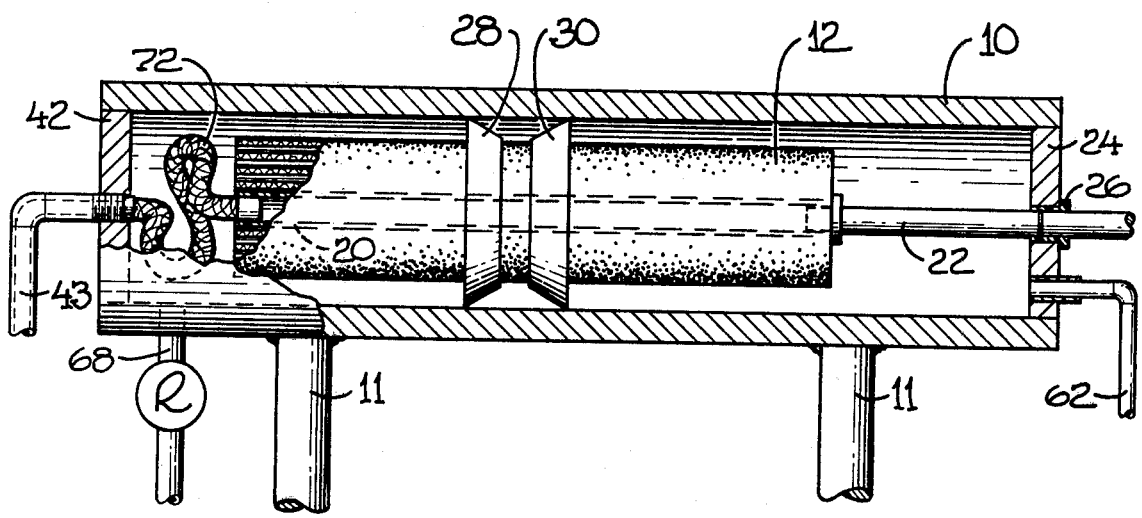
FIG. 3 shows a general side view, partly broken out, of a pressure resistant vessel corresponding generally to that of FIG. 1 but illustrating an alternative embodiment of the apparatus of this invention.

Referring now to FIG. 3, pressure resistant vessel 10 contains semipermeable membrane cartridge 12 to which is attached at one end rod 22 which passes sealingly and slidably through pressure resistant vessel end 24 or at 26, and is provided with feed inlet pipe 62 and brine or concentrate outlet pipe 68, all as more particularly described with respect to the embodiment of FIGS. 1 and 2. Opposite-facing chevron seals 28 and 30 reduce or prevent blow-by as also described previously. In this embodiment however the other end of permeate collector 20 is fixedly connected to a crooked length of flexible, non-collapsible and pressure resisting tubing 72, which connects permeate collector 20 with permeate release pipe 43 through a sealed fitting in pressure resistant vessel end 42. Flexible tubing 72 has substantially the same external diameter as rod 22 so that the effective cross sectional areas of the ends of semipermeable membrane cartridge 12 are substantially the same and the longitudinal forces exerted by adjacent liquids are essentially balanced. Flexible tubing 72 is longer than the distance between the internal end of pressure resistant vessel 10 and the adjacent end of semipermeable membrane cartridge 12 even at its most remote location. It may be coiled, wound, hooked, curved or otherwise bent so that it can flex and conform to the variable distance between its connected ends. Being non-collapsible (as by implantation of coiled wire in its wall) its diameter will remain constant during flexing, and its effective cross sectional area, which will be subtracted from the over all cross sectional area of the end of semipermeable membrane cartridge 12, will not be affected by its length or crooked shape. This embodiment has the advantage of eliminating the sliding seal at the end opposite to the reciprocating rod.

I claim:

1. Apparatus for treating liquid by reverse osmosis comprising; a tubular pressure resistant vessel containing a semipermeable membrane cartridge comprising a membrane, a permeate transfer sheet and a spacer sheet all sprially wound around a central permeate collection tube, and providing generally longitudinal channels for passage of feed liquid therethrough, said semipermeable membrane cartridge being of cylindrical configuration and being materially shorter than said tubular pressure resistant vessel, and being of diameter to fit slidably inside said tubular pressure resistant vessel; means for introducing pressurized impure feed liquid into said tubular pressure resistant vessel near one end thereof for longitudinal passage through said semipermeable membrane cartridge; and means for releasing concentrate from said tubular pressure resistant vessel near the other end thereof while maintaining operating pressure therein; in which the improvement comprises:

a. means comprising a tube connected to said permeate collection tube of said semipermeable membrane cartridge at an end of said semipermeable membrane cartridge for releasing permeate produced by said semipermeable membrane cartridge from said tubular pressure resistant vessel;
   b. means attached to an end of said semipermeable membrane cartridge for reciprocating said semipermeable cartridge within said tubular pressure resistant vessel during passage of feed liquid therethrough; and,
   c. means for providing an effective cross sectional area of the end of said semipermeable membrane cartridge exposed to the pressure of said feed liquid in said tubular pressure resistant vessel substantially the same as the effective cross sectional area of the end of said semipermeable membrane cartridge exposed to the pressure of said concentrate in said tubular pressure resistant vessel;
   d. whereby the forces exerted by the pressure of feed liquid on one end of said semipermeable membrane cartridge and force exerted by the pressure of concentrate on the other end of said semipermeable membrane cartridge are essentially balanced.

2. Apparatus according to claim 1 in which said means for releasing permeate comprise a rigid tube sealingly passing through an end of said pressure resistant vessel and slidably and sealingly connected to the central permeate collector of said semipermeable membrane cartridge.

3. Apparatus according to claim 1 in which said means for releasing permeate comprise a flexible, crooked, pressure resistant, non-collapsible tube fixedly connected to an end of the central permeate collector of said semipermeable membrane cartridge and passing sealingly through a wall of said pressure resistant vessel near one end thereof.

4. Apparatus according to claim 3 in which said flexible, crooked, pressure resistant non-collapsible tube passes sealingly and fixedly through an end of said pressure resistant vessel.

* * * * *